(12) United States Patent
Timms et al.

(10) Patent No.: US 12,208,878 B2
(45) Date of Patent: Jan. 28, 2025

(54) DOOR ARRANGEMENT FOR USE ON AN AIRCRAFT

(71) Applicant: Goodrich Actuation Systems Limited, Solihull (GB)

(72) Inventors: Jack William Timms, Wolverhampton (GB); Christopher Weston, Walsall (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 265 days.

(21) Appl. No.: 17/572,761

(22) Filed: Jan. 11, 2022

(65) Prior Publication Data

US 2022/0228414 A1     Jul. 21, 2022

(30) Foreign Application Priority Data

Jan. 15, 2021     (EP) ..................................... 21275005

(51) Int. Cl.
*B64C 1/00* (2006.01)
*B64C 1/14* (2006.01)

(52) U.S. Cl.
CPC ................................. *B64C 1/1407* (2013.01)

(58) Field of Classification Search
CPC .................................................. B64C 1/1407
See application file for complete search history.

(56) References Cited

U.S. PATENT DOCUMENTS

| | | | |
|---|---|---|---|
| 2,558,220 A | 6/1951 | Mclachlan | |
| 2,921,501 A | 1/1960 | Parot | |
| 4,488,380 A | 12/1984 | Howse | |
| 4,930,398 A * | 6/1990 | Sharples | ............... B64C 1/1407 89/1.51 |
| 5,752,344 A | 5/1998 | Richmond | |
| 7,338,012 B2 | 3/2008 | Rouyre | |
| 8,245,976 B2 | 8/2012 | Sakurai et al. | |
| 11,401,035 B2 * | 8/2022 | Kooiman | .................. B64C 1/22 |
| 2011/0203182 A1 | 8/2011 | Kennedy et al. | |
| 2019/0210738 A1 | 7/2019 | Arany-Kovacs et al. | |

OTHER PUBLICATIONS

European Search Report for Application No. 21275005.3, mailed Jun. 18, 2021, 8 pages.

* cited by examiner

*Primary Examiner* — Daniel J Troy
*Assistant Examiner* — Daniel Alvarez
(74) *Attorney, Agent, or Firm* — CANTOR COLBURN LLP

(57) ABSTRACT

A door arrangement, for use on an aircraft, includes a door and an actuation arrangement. The arrangement is configured to move the door between an open position and a closed position. The actuation arrangement includes: a first member coupled to the door such that movement of the first member moves the door; a second member pivotally coupled to the first member and arranged to drive movement of the first member, wherein the second member is movable between a first position which corresponds to the door being in an open position and a second position which corresponds to the door being in a closed position; and an actuator arranged to rotate the second member between the first position and second positions. The door arrangement further comprises a fixed stop.

15 Claims, 11 Drawing Sheets

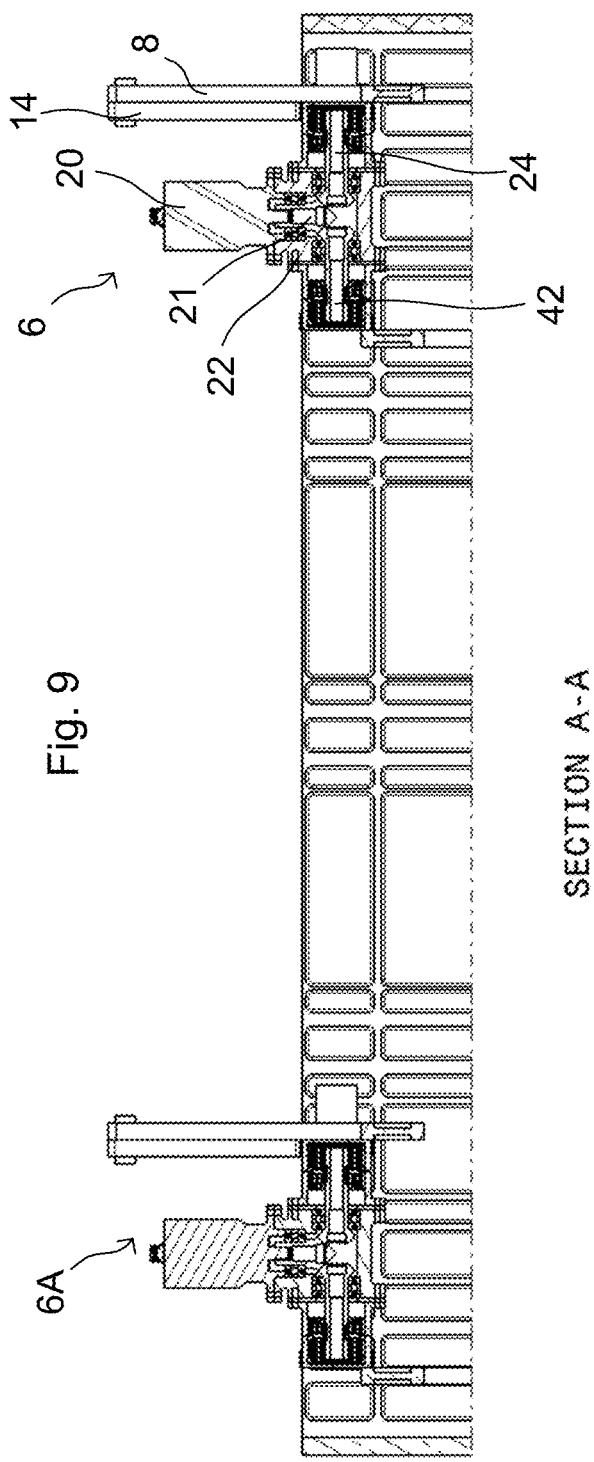

DOOR ARRANGEMENT FOR USE ON AN AIRCRAFT

CROSS-REFERENCE TO RELATED APPLICATIONS

This application claims priority to European Patent Application No. 21275005.3 filed Jan. 15, 2021, the entire contents of which is incorporated herein by reference.

TECHNICAL FIELD

This disclosure relates to a door arrangement for use on an aircraft, and to an aircraft comprising such a door arrangement.

BACKGROUND ART

Aircraft typically comprise a number of external doors which allow access to parts of the aircraft or allow deployment of in air equipment. Particularly when the aircraft is in flight, the doors experience significant external forces which try to move the doors into an open position. The external forces acting to move the doors towards an open position may be any relevant force and may, for example, be the result of pressure differences between an inside and an outside of the door or the result of passing airflow which can act to pull the door towards an open position. In prior art systems, in order to resist the external forces, and hold the doors in a closed position, the doors typically comprise locks which act on an end of the door to hold it in place. The locks typically latch onto the door to hold it in the closed position. As will be appreciated, the locks may have to resist significant forces and thus may become worn over time. The replacement of the locks may be costly and time consuming. Additionally, in prior art systems, the external forces are often at least partially transferred through the door directly to the actuator which controls movement of the door. As a result, over time, the actuator may become damaged as a result of these forces, and may also require replacement. Again, this may be costly and time consuming.

It would be advantageous to provide a door arrangement for use on an aircraft which addresses the problems outlined above.

SUMMARY OF THE DISCLOSURE

In accordance with a first aspect, the present disclosure provides a door arrangement, for use on an aircraft. The arrangement includes: a door and an actuation arrangement, configured to move the door between an open position and a closed position. The actuation arrangement includes: a first member coupled to the door such that movement of the first member moves the door and a second member pivotally coupled to the first member and arranged to drive movement of the first member. The the second member is movable between a first position which corresponds to the door being in an open position and a second position which corresponds to the door being in a closed position. The actuation arrangement also includes: an actuator arranged to rotate the second member between the first position and second positions; and a fixed stop arranged such that when the second member is in the second position, an external force acting on the door acting to move the door towards its open position causes at least one of the first member and second member to contact the fixed stop and thereby prevent movement of the door towards the open position.

Thus it will be appreciated that aspects of the present disclosure provide an improved door arrangement which prevents the opening of the door by the external force. In accordance with the present disclosure, the fixed stop acts to stop the external force from moving the door into the open position. The use of a fixed stop may remove the need to provide a lock and may also minimise the amount of force which is transferred to the actuator. In the door arrangement of the present disclosure, the external force is transferred, via the first member and/or second member, to the fixed stop, rather than being transferred to an actuator or a lock as is the case in the prior art. The fixed stop may be purpose designed to withstand the external forces which the door arrangement experiences. The fixed stop may be considered to prevent back driving of the door arrangement.

The external force may be any force other than the force provided by the actuation arrangement. For example, the external force may be a force provided by the weight of the doors themselves, the aerodynamic effects of door surfaces or edges which protrude into an airflow passing over the door and/or a force applied as a result of a pressure difference between two sides of the door.

In a set of examples, the first member and second member form an over centre arrangement, and wherein when the second member is in the second position, the first member and second member are in an over centre position such that the external force acts to drive the first member towards the fixed stop. The first member being driven towards the fixed stop may simultaneously drive the second member to be driven towards the fixed stop.

Which of the first and second members ends up in contact with the fixed stop may depend on the relative position of the fixed stop and the particular arrangement of the first and second members. Of course, if one of the first and second members is already in contact with the fixed stop when the second member is in the second position, the external force may not actually move the first member and/or the second member but may instead act to increase the force holding the first member and/or second member against the fixed stop. Alternatively, when the second member is in the second position corresponding to the door being in the closed position, the first member and/or the second member may be separated from the fixed stop, and thus the external force may cause the first member and/or the second member to move slightly before coming into contact with the fixed stop. It will be appreciated that the external force acts through the door, and through the first member which is coupled to the door.

Contact between the first member and/or the second member and the fixed stop may not require direct physical contact. For example, an intermediate member, arranged between the first member, and/or the second member, and the fixed stop may come into contact with the fixed stop. The first member and/or second member may thus indirectly contact the fixed stop. Alternatively, the first member and/or second member may come into direct contact with the fixed stop.

The fixed stop and the first and second members may be arranged such that one or both of the first and second members come into contact with the fixed stop when an external force acts on the door acting to move the door towards its open position. Contact of both of the first and second members with the fixed stop may advantageously distribute the external force through each of the first and second members which may minimise the wear of the first and second members and potentially increase the amount of contact between the first and second members and the fixed stop. However, in another set of examples, the fixed stop is positioned such that only the first member comes into contact with the fixed stop. Positioning the fixed stop in this manner may advantageously prevent or minimise the amount of force transferred to the second member, and thus prevent or minimise the amount of force which is transferred to the actuator. This may advantageously minimise any damage caused to the actuator by the external force and mean that the actuator does not have to be designed to be capable of accounting for such forces.

The door may be any door which can be moved between open and closed positions by the actuation arrangement. For example, the door may translate, e.g. by sliding. Of course, the actuation arrangement, specifically the first and second members, may be designed to control suitable movement of the door. In a set of examples, the door is pivotally mounted to a support structure at a first pivot point. The door may thus be a rotatable door. The support structure may be a support structure of the door arrangement itself, or the structure to which the door arrangement is mounted. In examples in which the door is pivotally mounted, the first member and second member may be arranged in any suitable manner such that movement of the second member drives movement of the first member which causes rotation of the door about the first pivot point. The first member may be fixedly coupled to the door, such that rotation of the first member causes rotation of the door. In this case, the first member may be fixedly coupled at the first pivot point. In another set of examples, the first member is pivotally coupled to the door at a second pivot point. The second pivot point may have any suitable position on the door. In a set of examples, the second pivot point is spaced from the first pivot point. Spacing the second pivot point from the first pivot point may advantageously reduce the force which is transferred via the first member to the fixed stop and thus reduce the force which the fixed stop needs to be capable of withstanding.

The fixed stop may be a permanent, i.e. irreplaceable, component of the door arrangement. For example, the fixed stop may be an integrally formed part of the door arrangement. In such examples, the fixed stop may be designed to last the expected lifetime of the door arrangement. In an alternative a set of examples, the fixed stop is detachably mounted. Accordingly, the fixed stop may be detached, and replaced with a replacement fixed stop when the fixed stop becomes worn. The provision of a detachably mounted fixed stop may therefore facilitate easy maintenance of the door arrangement and potentially increase its life span.

As will be appreciated by those skilled in the art, as the fixed stop prevents an external force from driving the door towards the open position, when the second member is in the second position, the fixed stop may also act to define the second position of the second member and thus the closed position of the door. For example, the second position may be defined as the position of the second member when it comes into contact with the fixed stop. In a set of examples, a position of fixed stop is adjustable. Adjustment of the position of the fixed stop may therefore allow adjustment as to the degree of movement of the second member which may therefore define the second position of the second member, which may at least partially define the closed position of the door. Accordingly, the position of the fixed stop may be adjusted to adjust the closed position of the door. This may facilitate simple maintenance of the door arrangement. For example, if, for some reason, the door is not closing fully or is closing too much, the position of the fixed stop may be adjusted so that it redefines the second position such that the closed position of the door is adjusted as desired.

Providing a fixed stop having an adjustable position may be achieved by any suitable means. For example, the fixed stop may be fixed in place by at least one fixing element, e.g. a bolt. It may be possible to release the fixing element, reposition the fixed stop, and reaffix the fixing element. For example, the fixed stop may be arranged to move within a slot which provides a plurality of positions which the fixed stop can be moved into, and the fixing element may secure the fixed stop in place, i.e. hold it in a fixed position, in the slot.

The fixed stop may be made from any material which can suitably withstand the first or second member repeatedly coming into contact with it without imparting wear or damage to the first and second members. The fixed stop, or indeed a coating applied thereto, may be made from any material which is suitable to withstand the force and contact of the first and/or second members which may be experienced during operation. For example, the fixed stop may be made from any one of: a copper alloy, e.g. phosphor bronze, aluminium bronze, copper nickel tin alloys, rubber or plastic. The entire of the fixed stop may be made from the materials described above. Of course, in some examples, only a portion of the fixed stop which the first and/or second members comes into contact with may be made from a material suitable for repeated contact, and the rest of the fixed stop may be made from any other suitable material. As the door arrangement may experience significant temperature fluctuations in use, it may be advantageous for the fixed stop to be capable of withstanding such temperature variations. Thus, in a set of examples the fixed stop is made from a soft metal, e.g. a copper alloy.

The first member and/or the second member may be made from any suitable material. In a set of examples, the first member and/or the second member is made from a material with a higher wear resistance than the fixed stop. This may advantageously mean that the fixed stop wears as a result of the interaction between the first member and/or the second member and the fixed stop, rather than the first member and/or second member. The fixed stop may be easier to replace than the first and/or second members and so this may facilitate simpler maintenance of the door arrangement. The first member and/or the second member may, for example, be made from at least one of: hardened steel, steel, titanium and aluminium.

The degree of contact between the first member and/or second member and the fixed block may impact how securely the door is held in the closed position. The degree of contact may also impact the level of wear on the first member and/or second member and/or the fixed block. In a set of examples, the fixed stop comprises a rounded surface against which the first member and/or second member comes into contact with. In another set of examples, the first member and/or the second member comprises a respective rounded surface arranged to come into contact with the fixed stop. The rounded surface of the fixed stop and/or the first member and/or the second member may be curved in a single direction, i.e. such that the surface is at least partially cylindrically shaped, or be curved in multiple directions such that it forms an at least partially spherical surface. The use of a rounded surface may ensure that irrespective of the point at which the first member and/or the second member comes into contact with the fixed stop, there is a predictable degree of contact. The rounded surface may also ensure that there is sufficient contact even as the fixed stop and/or the first member and/or the second member becomes worn through repeated contact. In a set of examples, the rounded surface has a radius which is as large as possible, whilst maintaining appropriate geometric contact between the rounded surface and the point of contact between the fixed stop and first and/or second members under all potential positions of the first and/or second members relative to the fixed stop. A radius which is as large as possible may ensure appropriate contact between the first member and/or the second member and the fixed stop irrespective of any misalignment which may occur.

Depending on the size of the door, some examples may comprise a plurality actuation arrangements. Each actuation arrangement may comprise any of the features of the examples described above and function in an identical manner. Each of the actuation arrangements may be spaced along the length of the door and thus the force acting to drive the door between the open and closed positions may be distributed along the length of the door. The actuation arrangement may comprise any suitable actuator capable of driving the second member between the first and second positions. The actuator may, for example, comprise a motor which drives movement of the second member. The motor may, for example, comprise an electric, hydraulic or pneumatic motor. The actuator may further comprise a gearbox coupled to the motor and the second member. The gearbox may be capable of creating the torques necessary to drive movement of the second member and thus the door. The gearbox may be a high ratio gearbox and may, for example, have a ratio of at least 100:1.

For certain openings, it may be desirable to have multiple doors. For example, for larger openings, a single door may otherwise be too large and cumbersome to control. Thus, in a set of examples, the door arrangement comprises a further door, and wherein the actuation arrangement comprises: a third member coupled to the further door such that movement of the third member moves the further door between an open position and a closed position; a fourth member pivotally coupled to the third member and arranged to drive movement of the third member, wherein the fourth member is movable between a respective first position which corresponds to the further door being in the open position and a respective second position which corresponds to the further door being in the closed position; and a further fixed stop arranged such that when the fourth member is in the second position, an external force acting on the further door acting to move the further door towards its open position causes at least one of the third member and fourth member to contact the fixed stop and thereby prevent movement of the further door towards the open position.

Accordingly, the further door may also be prevented from moving towards an open position by the external forces. The fourth member may be rotatable between the first position and second position. The fourth member may be moved, e.g. rotated, by a further actuator, which is different to the actuator which rotates the second member. However, this may require suitable synchronisation of the actuator and further actuator in order to open and close the door and further door simultaneously. Thus, in a set of examples, the actuator is further arranged to drive the fourth member between the first position and second position. The actuator may comprise a rotary geared actuator. Through the use of the same actuator, movement of the door and further door may by synchronised more easily.

The actuator may comprise any suitable arrangement for moving the second member and the fourth member. For example, the actuator may comprise a motor and at least one gearbox coupled to the motor and arranged to drive each of the second member and fourth member. The motor may be any suitable motor and may, for example, comprise an electric, hydraulic or pneumatic motor. Any suitable gearbox may be used. The ratio of the gearbox may depend on the motor being used and the size of the doors being moved. In order to achieve the torques necessary to move the door and the further door between the open and closed positions, the gearbox may have a high ratio. For example, the gearbox may have a ratio of at least 100:1.

In a further set of examples, the actuator comprises a dual output gearbox which comprises a first output and a second output, and wherein the first output is arranged to rotate the second member and the second output is arranged to rotate the fourth member. The dual output gearbox may be in the form of a T-gearbox. The use of a dual output gearbox may simplify the synchronization of movement of the door and further door. For example, each of the first output and second output of the dual output gearbox may be synchronized and thus movement of the door and further door may be synchronized. This mechanical synchronization provided by the dual output gearbox may be simpler and easier to implement when compared to the alternative examples whereby separate actuators are provided for each of the second member and fourth member.

The third member may comprise any of the features of the first member described above, and may also be configured in a similar manner to the first member described above. Similarly, the fourth member may comprise any of the features of the second member described above, and may also be configured in a similar manner to the second member described above. Additionally, each of the door and further door may comprise a plurality of actuation arrangements.

As will be appreciated, the external forces may generally act to move the door towards the open position in one direction. For example, the external forces may generally act to pull the door outwards or push the door inwards. However, in some instances, external forces may act to force the door in a different direction. For example, the external force may act to push the door in an inward direction, against its normal direction of movement towards the open position. In a set of examples, the actuator is arranged to actively drive the first and/or second member into contact with the fixed stop when the door is in the closed position. As such, the actuator may continuously act to hold the first member and/or second member in contact with the fixed stop when the door is in the closed position. In such examples, an external force acting to move the door towards its open position in one direction will cause the first member and/or second member to pull against the fixed stop and thus the door will be prevented from opening. An external force acting to move the door in a different direction, e.g. pushing the door inwards against its normal movement direction, may act to drive the first member and/or second member away from the fixed stop. However, in examples as described above, movement of the first and/or second members away from the fixed stop may be resisted by the actuator which is actively driving the first member and/or second member into contact with the fixed stop. Movement of the door may thus be prevented irrespective of the action of the external force. As external forces acting to drive the first and/or second member away from the fixed stop may be significantly less than the forces tending to move the door towards its open position, the motor may be capable of resisting this motion without experiencing significant wear. Such an arrangement may advantageously prevent movement of the door irrespective of the external force without requiring the use of additional locks. In examples comprising a further door, the actuator may also be arranged to actively drive the third and/or fourth member into contact with the further fixed stop when the further door is in the closed position.

In another set of examples, the fixed stop may be arranged to stop movement of the door in a first direction, i.e. when moving towards an open position, and the door arrangement may comprise a separate holding means for preventing movement of the door in a second, different direction. The holding means may, for example, comprise a locking arrangement which may be provided to prevent the door and optionally the further door from moving in the second direction. The external forces may be larger in the first direction, when compared to the second direction, and thus the holding means may not have to be capable of withstanding forces as large as those experience by the fixed stop.

According to a further aspect of the present disclosure there is provided an aircraft comprising a door arrangement according to any of the examples described above.

The door arrangement may be any suitable door arrangement on the aircraft. For example, the door arrangement may be an undercarriage door arrangement, a door arrangement which provides access to an auxiliary power unit, a door arrangement which provides access to a refueling arm bay, a door arrangement which allows access to a Ram Air Turbine or a payload-bay door arrangement.

According to another aspect of the present disclosure there is disclosed an actuation arrangement, for moving a door on an aircraft between an open position and a closed position includes: a first member configured to be coupled to the door such that movement of the first member moves the door; a second member pivotally coupled to the first member and arranged to drive movement of the first member, wherein the second member is movable between a first position which corresponds to the door being in an open position and a second position which corresponds to the door being in a closed position; and an actuator arranged to rotate the second member between the first position and second position; and a fixed stop arranged such that when the second member is in the second position, an external force acting on the first member causes at least one of the first member and second member to contact the fixed stop and thereby prevent movement of the first member.

The actuation arrangement of this aspect of the disclosure may comprise any of the features related to the actuation arrangement described above with respect to the door arrangement. In accordance with this aspect of the disclosure, the door does not form part of the actuation arrangement. However, when installed, the actuation arrangement may be suitably coupled to a door, e.g. through the coupling of the first member to the door. When coupled to a door, any external forces acting on the door will act through, i.e. on, the first member. Further, as will be appreciated, as the first member is configured to be coupled to the door, by preventing movement of the first member, this will consequently prevent movement of the coupled door. According to a further aspect of the present disclosure there is provided an aircraft comprising an actuation arrangement as described above. The aircraft may comprise a door to which the first member is coupled.

BRIEF DESCRIPTION OF THE DRAWINGS

Certain examples of the present disclosure will now be described with reference to the accompanying drawings, in which:

FIG. 9 is a sectional view through the section A-A indicated in FIG. 2A;

DETAILED DESCRIPTION

Figure 1:
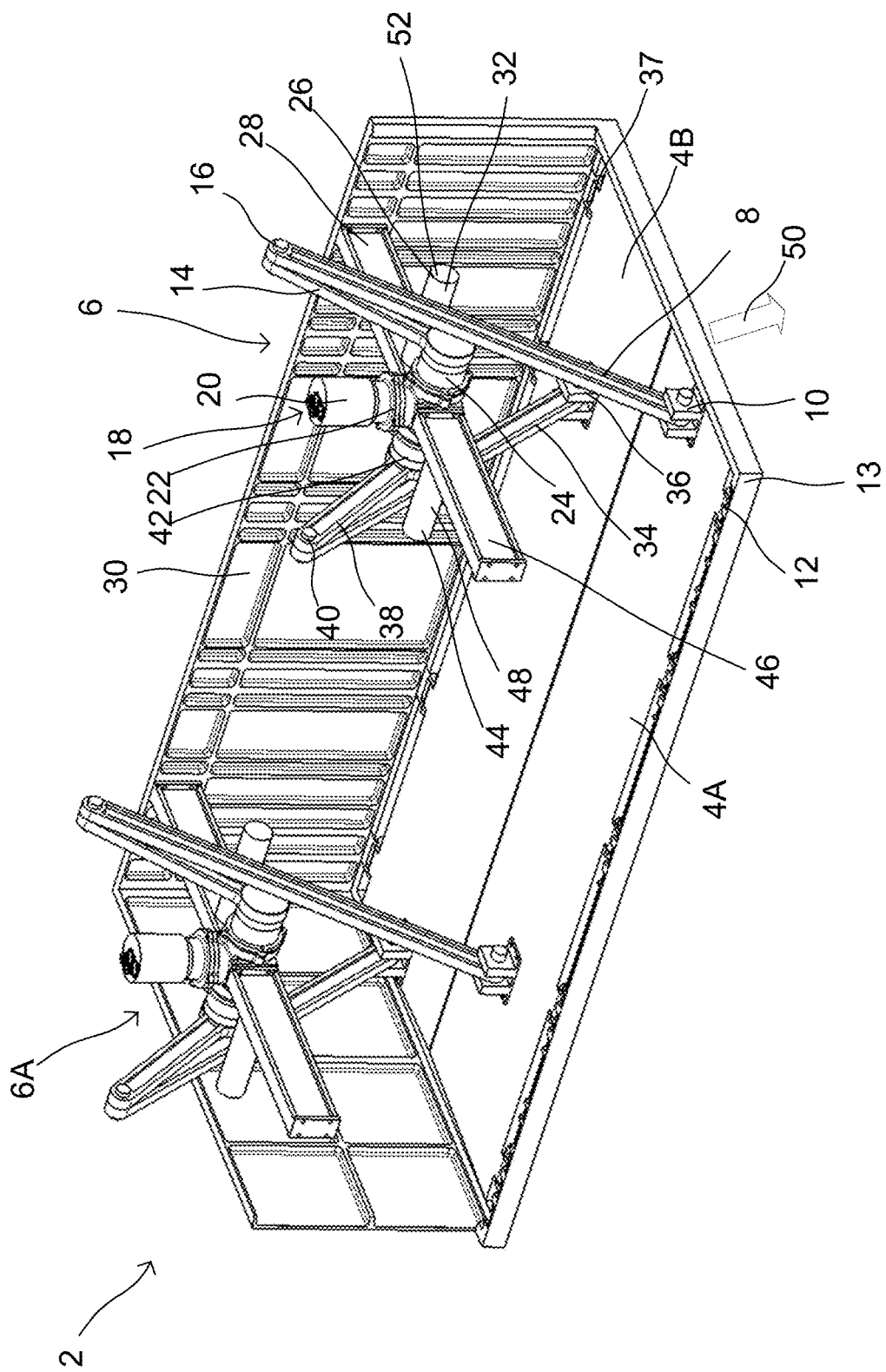
FIG. 1 is a perspective view of a door arrangement, in accordance with an example of the present disclosure, with the doors in a closed position.

FIG. 1 shows a perspective view of a door arrangement 2, for use on an aircraft, in accordance with an example of the present disclosure. Part of the structural wall 30 of the door arrangement 2 is removed to reveal the internal components of the door arrangement 2. As is visible, the door arrangement 2 comprises a door 4A and a further door 4B. The door 4A and further door 4B are pivotally mounted doors. The door arrangement 2 further comprises an actuation arrangement 6 which is configured to move the door 4A and the further door 4B between an open position and a closed position. In FIG. 1, the door 4A and further door 4B are shown in the closed position.

The actuation arrangement 6 comprises a first member 8 which is pivotally coupled to the door 4A at a second pivot point 10. The second pivot point 10 is spaced from a first pivot point 12 about which the door 4A is mounted to the structure 13 of the door arrangement 2. A second member 14 is pivotally coupled to the first member 8 at a respective pivot point 16 and is arranged to drive movement of the first member 8. The second member 14 is arranged to rotate between first and second positions. The actuation arrangement 6 comprises an actuator 18 which comprises a motor 20 which drives a dual output gearbox 22. The motor 20 may be an electric, hydraulic or pneumatic motor. A first output 24 of the dual output gearbox 22 is operatively coupled to the second member 14 and acts to rotate the second member 14. In the example depicted, the dual output gearbox 22 also acts to drive a fourth member 38 as will be described in more detail below. However, in examples in which the door arrangement 2 only comprises a single door 4A, it will be appreciated that the dual output gearbox 22 may be replaced by a single output gearbox.

The door arrangement 2 further comprises a fixed stop 26. In the example depicted, the fixed stop 26 is fixedly mounted to a beam 28 which is fixedly coupled to a structural wall 30. The structural wall 30 may be a wall of the door arrangement 2 itself, or a wall of the component to which the door arrangement 2 is affixed, e.g. a structural wall of the aircraft itself. The fixed stop 26 is held in a fixed position relative to the other components of the door arrangement 2. As depicted, the fixed stop 26 has a rounded outer surface 32.

In order to move the further door 4B between the open and closed positions, the door arrangement 2 comprises a third member 34 which is coupled to the further door 4B. As depicted, the third member 34 is pivotally coupled to the further door 4B at a respective second pivot point 36 which is spaced from a respective first pivot point 37 at which the further door 4B is mounted to the structure 13 of the door arrangement 2. The actuation arrangement 6 further comprises a fourth member 38 which is pivotally coupled to the third member 34 at a respective pivot point 40. In the example depicted, the fourth member 38 is coupled to a second output 42 of the dual output gearbox 22. The second output 42 drives the fourth member 38 to rotate between first and second positions.

The door arrangement 2 comprises a further fixed stop 44 which is fixedly mounted to a beam 46. The beam 46 is fixedly coupled to a structural wall (not visible in this Figure). The further fixed stop 44 comprises a rounded surface 48.

As depicted, the first member 8 and third member 34 are coupled to the door 4A and further door 4B at a first end thereof. In the example depicted, the door arrangement 2 comprises a further actuation arrangement 6A. The actuation arrangement 6A is identical to the actuation arrangement 6 described above, except that its members are coupled to a second end of the door 4A and further door 4B. The actuation arrangement 6A operates in an identical manner to the actuation arrangement 6 and thus description of its operation will not be repeated. The use of multiple actuation arrangements 6, 6A as depicted may ensure that the door 4A and further door 4B can be opened in an appropriate manner. Of course, any number of actuation arrangements may be included and the number and distribution may depend on the size of the door 4A and further door 4B.

Operation of the door arrangement 2 will be now be described, first with reference to FIG. 1. As depicted in FIG. 1, the second member 14 and the fourth member 38 are in a second position which corresponds to the door 4A and further door 4B being in the closed position. In the example depicted, the fixed stop 26 and further fixed stop 44 is arranged such that when an external force 50 (depicted by the arrow) acts to pull the door 4A and further door 4B towards an open position, the first member 8 and the third member 34 come into contact with the fixed stop 26 and further fixed stop 44, respectively. The contact between the first member 8 and the fixed stop 26 prevents the first member 8 from moving any further than the fixed stop 26 and thereby prevents the door 4A from moving towards an open position. Similarly, the contact between the third member 34 and the further fixed stop 44 prevents the third member 34 from moving any further than the further fixed stop 44 and thereby prevents the further door 4B from moving towards an open position. Accordingly, the fixed stop 26 and the further fixed stop 44 act to stop the door 4A and further door 4B from being opened when arranged appropriately as depicted. Of course, the fixed stop 26 and further fixed stop 44 may have any suitable arrangement such that an external force 50 acting to open the door 4A and further door 4B causes the first member 8 and/or second member 14 to abut against the fixed stop 26 and third member 34 and/or fourth member 38 to abut against the further fixed stop 44.

Figure 2A:
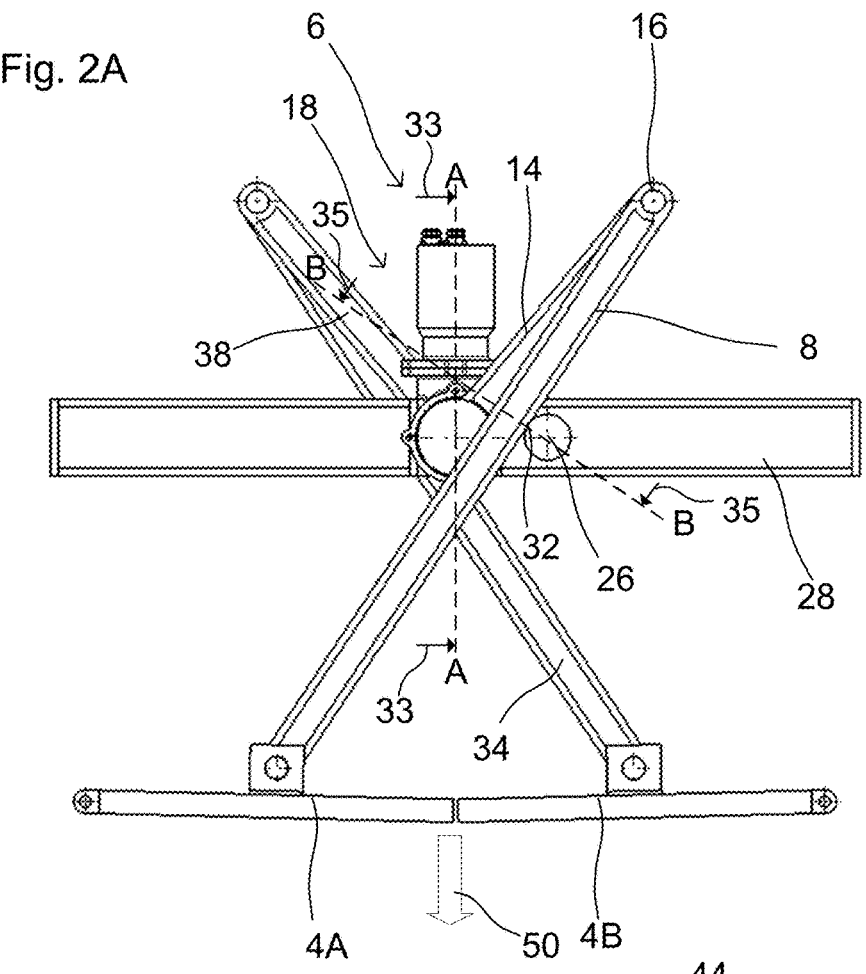
FIG. 2A is an end-on view of the door arrangement shown in FIG. 1.

FIG. 2A shows an end-on view when looking at the end face 52 of the fixed stop 26 of the door arrangement 2 in the configuration shown in FIG. 1. The further fixed stop 44 is not visible in this Figure and so discussion will be focused on the first member 8 and second member 14 and their interaction with the fixed stop 26. However, the same may apply to the third member 34 and the fourth member 38. As depicted, when an external force 50 acts to try and move the door 4A towards an open position, the first member 8 comes into contact with the fixed stop 26. As will be appreciated, due to the constraints of the first member 8, for example because it is pivotally coupled to the second member 14 and pivotally coupled to the door 4A, when the first member 8 is in contact with the fixed stop 26, the first member 8 cannot move any further under the external force 50. Accordingly, this acts to prevent the door 4A from moving towards an open position. The fixed stop 26 comprises a rounded surface 32 which contacts the first member 8. The rounded surface 32 ensures consistent contact between the first member 8 and the fixed stop 26 irrespective of the relative position of the first member 8 and the fixed stop 26.

Figure 2B:
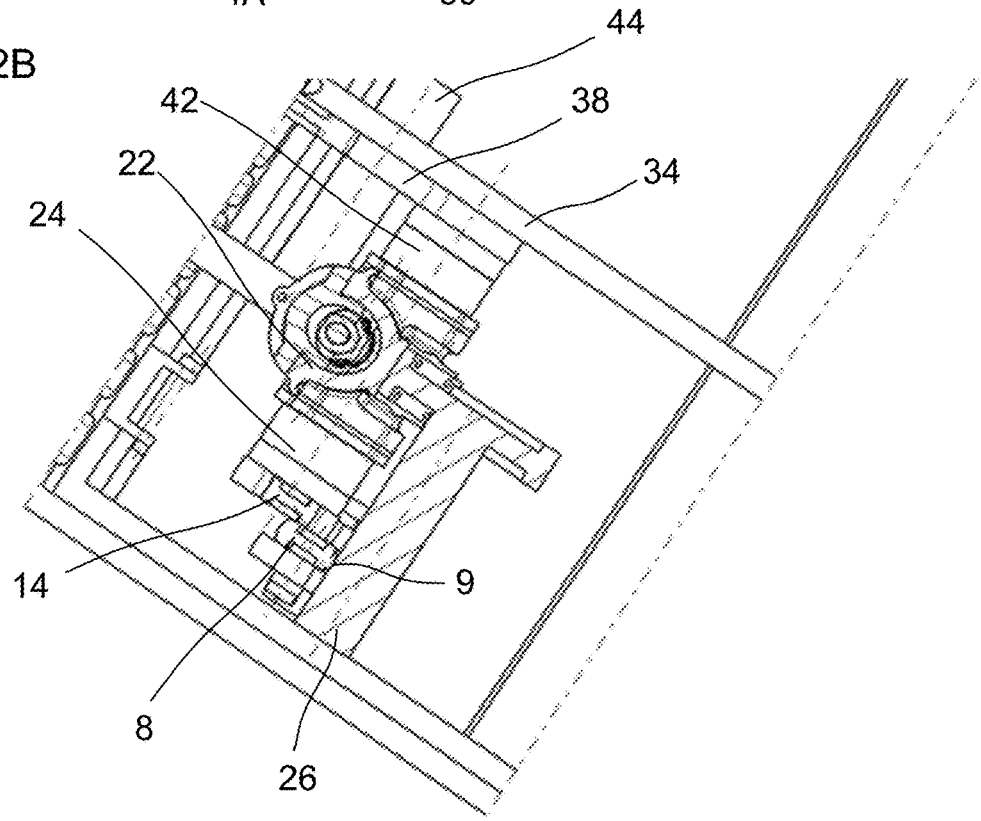
FIG. 2B is a sectional view of the door arrangement through the line B-B shown in FIG. 2A.

FIG. 2B shows a sectional view of the door arrangement 2 through the line B-B, shown in FIG. 2A, when viewed from the direction indicated by arrows 35. This sectional view illustrates the dual output gearbox 22 with the first output 24 coupled to the second member 14, which is coupled to the first member 8. In the sectional view shown, the cross sections of the first member 8 and second member 14 are visible. The second output 42 of the dual output gearbox 22 is coupled to the fourth member 38 which is coupled to the third member 34.

In the position shown, the first member 8 abuts against the fixed stop 26 and the third member 34 abuts against the further fixed stop 44. As shown in this Figure, the first member 8 comprises a rounded surface 9 which comes into contact with the fixed stop 26. This rounded surface 9 may help to ensure that the first member 8 achieves a consistent amount of contact with the fixed stop 26, even if the first member 8 becomes partially misaligned with respect to the fixed stop 8. Whilst not visible in this sectional view, the third member 34 also has a similar rounded surface arranged to contact the further fixed stop 44. Additionally, whilst not depicted, in embodiments wherein the second member 14 and fourth member 38 contact the fixed stop 26 and further fixed stop 44, respectively, each of the second member 14 and fourth member 38 may comprise respective rounded surfaces.

In the example depicted in FIGS. 2A and 2B, the first member 8 comes into contact with the fixed stop 26 and the second member 14 does not. This may advantageously transfer at least a significant portion the external force to the fixed stop 26 and minimise the amount of force which is transferred to the actuator 18. However, in other examples, in addition or alternatively, the second member 14 may come into contact with the fixed stop 26. Additionally, whilst it is depicted that that first member 8 comes into direct contact with the fixed stop 26, the first member 8, or indeed the second member 14, may indirectly contact the fixed stop 26. For example, the first member 8 may comprise a member which extends therefrom which contacts the fixed stop 26. In the position depicted in FIGS. 2A and 2B, the first member 8 and second member 14 form an over centre mechanism and the first member 8 may be considered to be in an over-centre position with respect to the second member 14 and the pivot point 16. When in this over-centre position, the external force 50 pulls the first member 8 in a clockwise direction in the view shown, which brings the first member 8 into contact with the suitably arranged fixed stop 26.

Whilst in the example described above the fixed stop 26 is coupled to a beam 28 which is attached to the structural wall 30, the fixed stop 26 and indeed the further fixed stop 44 may have any suitable form. For example, the beam 28 may be omitted and the fixed stop 26 may be integrally provided with the structural wall 30. In this regard, the fixed stop 26 may be part of the structural wall 30. The same applies to the further fixed stop 44. Similarly, depending on the specific arrangement of the first, second, third and fourth members 8, 14, 34, 38, the fixed stop 26 and further fixed stop 44 may be integrally provided by a single component.

FIGS. 1, 2A and 2B show the second member 14 and fourth member 38 each in a second position which corresponds to the door 4A and the further door 4B being in a closed position, and when in this position the further force 50 causes the first member 8 to contact the fixed stop and the third member 34 to contact the further fixed stop 44. As will be appreciated, when in their respective second positions, the first member 8 and third member 34 may already be in contact with their respective fixed stops 26, 44 and thus the external force 50 may simply act pull the first member 8 and third member 34 against the fixed stops 26, 44 with an increased force. The first member 8 and third member 34 may be made from a material having a higher wear resistance than that of the fixed stop 26 and further fixed stop 44.

The second member 14 and fourth member 38 may be rotated towards a first position in which the door 4A and further door 4B is in an open position when it is desired to open the door 4A and further door 4B. Movement of the door 4A and further door 4B into this open position will now be described with reference to FIGS. 3 to 8.

Figure 3:
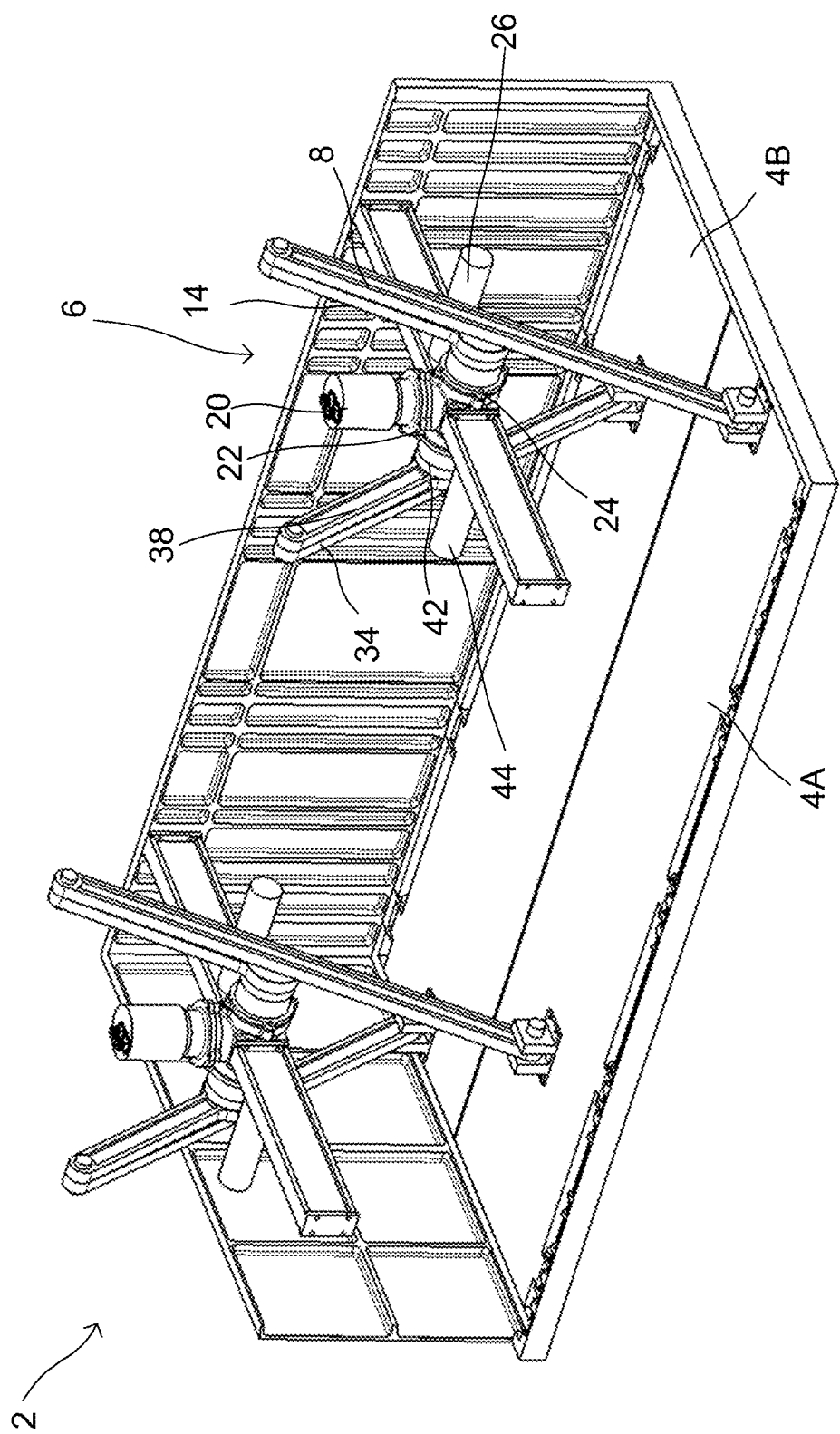
FIG. 3 is a perspective view of the door arrangement shown in FIG. 1 with the second member and fourth member in a first intermediate position.

FIG. 3 shows the door arrangement 2 in which second member 14 and fourth member 38, of the actuation arrangement 6, have been driven, i.e. rotated, by the motor 20 into a first intermediate position, between the second position shown in FIG. 1 and the first position shown later in FIGS. 7 and 8. As shown in FIG. 3, in the first intermediate position, the first member 8 has been driven by movement of the second member 14 to the point at which the first member 8 is aligned with the second member 14 such that they are on-centre. The same is the case for the third member 34 which has been driven by movement of the fourth member 38 and which is aligned with the fourth member 38 and therefore also on-centre. When in this first intermediate position, the first, second, third and fourth members 8, 14, 34, 38 have been rotated away from the fixed stop 26 and further fixed stop 44.

The dual output gearbox 22, in which the first output 24 and second output 42 are synchronized, advantageously means that the second member 14 and fourth member 38 have rotated by the same amount, and thus the door 4A and further door 4B are in the same positions.

Figure 4:
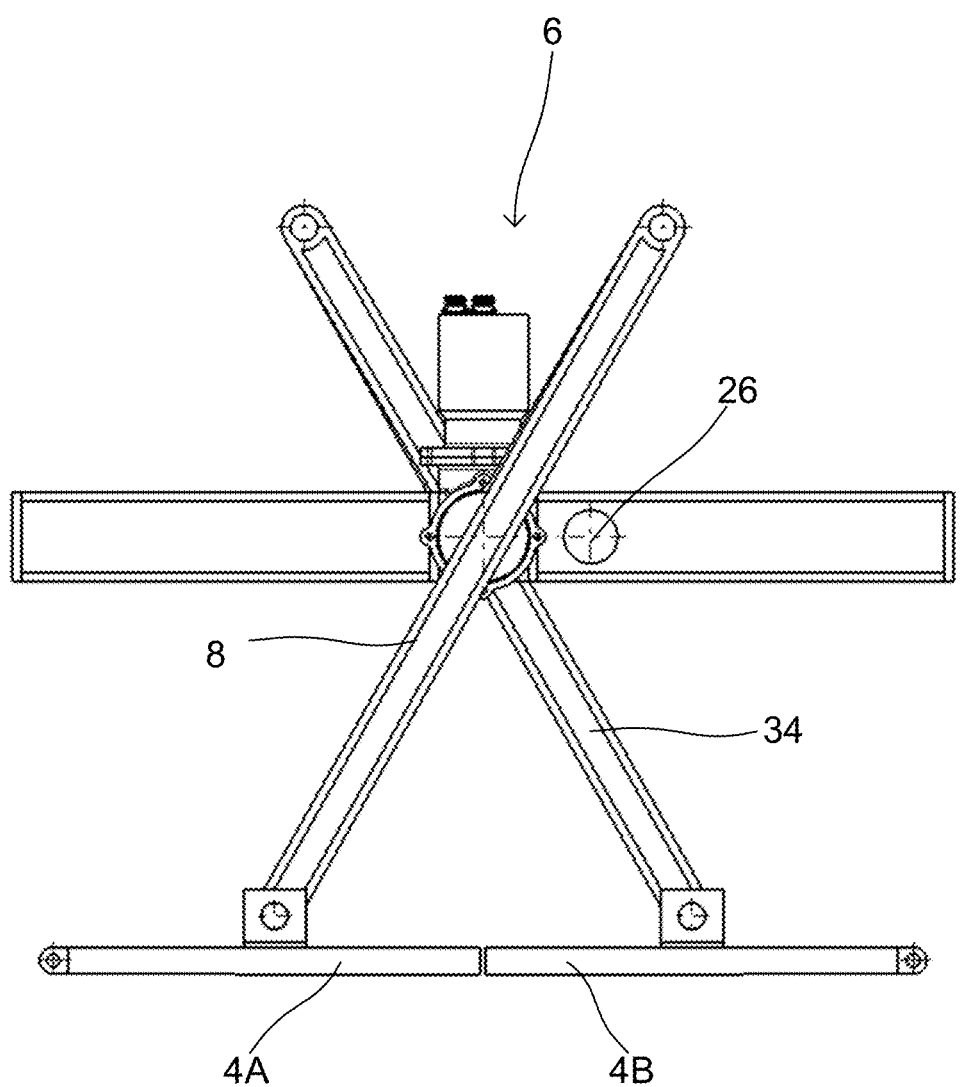
FIG. 4 is an end-on view of the door arrangement shown in FIG. 3.

FIG. 4 shows an end-on view of the door arrangement 2 in the configuration shown in FIG. 3, focusing on the actuation arrangement 6. As can be seen more clearly in this Figure, the first member 8 is aligned with the second member 14 and the third member 34 is aligned with the fourth member 38, and the second member 14 and fourth member 38 cannot be seen in this end-on view due to the alignment. Additionally, it can more clearly be seen how the first member 8, and therefore also the second member 14 (although not visible in the Figure), have rotated away from the fixed stop 26. As the second member 14 and fourth member 38 are moved into this first intermediate position, the door 4A and further door 4B are pulled inwards slightly, and may be pulled into a more closed position, or even just past the closed position to an inverted position.

Figure 5:
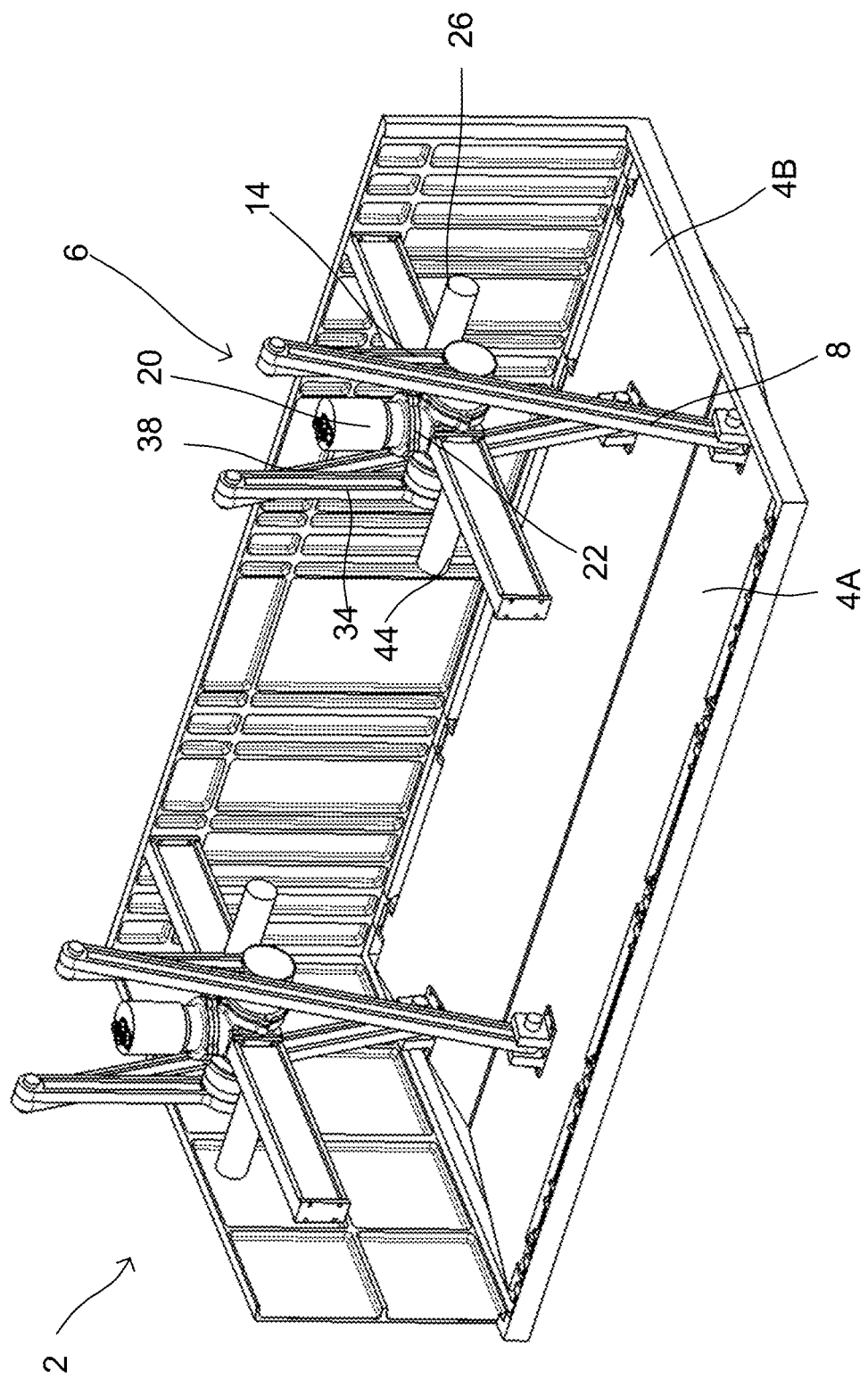
FIG. 5 is a perspective view of the door arrangement shown in FIG. 1 with the second member and fourth member in a second intermediate position in which the doors are partially opened.

FIG. 5 shows a perspective view of the door arrangement 2 with the second member 14 and fourth member 38 in a second intermediate position. The motor 20 and dual output gearbox 22 advantageously drive the second and fourth members 14, 38 simultaneously. Accordingly, the second and fourth members 14, 38 have been driven by the same rotational amount, thereby driving each of the first member 8 and third member 34 by the same amount, and thus the door 4A and further door 4B have been opened by the same amount. As depicted, in this second intermediate position, the door 4A and further door 4B are partially opened. As will be appreciated, when moving towards the second intermediate position shown, the first, second, third and fourth member 8, 14, 34 and 38 move further away from the respective fixed stop 26 and further fixed stop 44.

Figure 6:
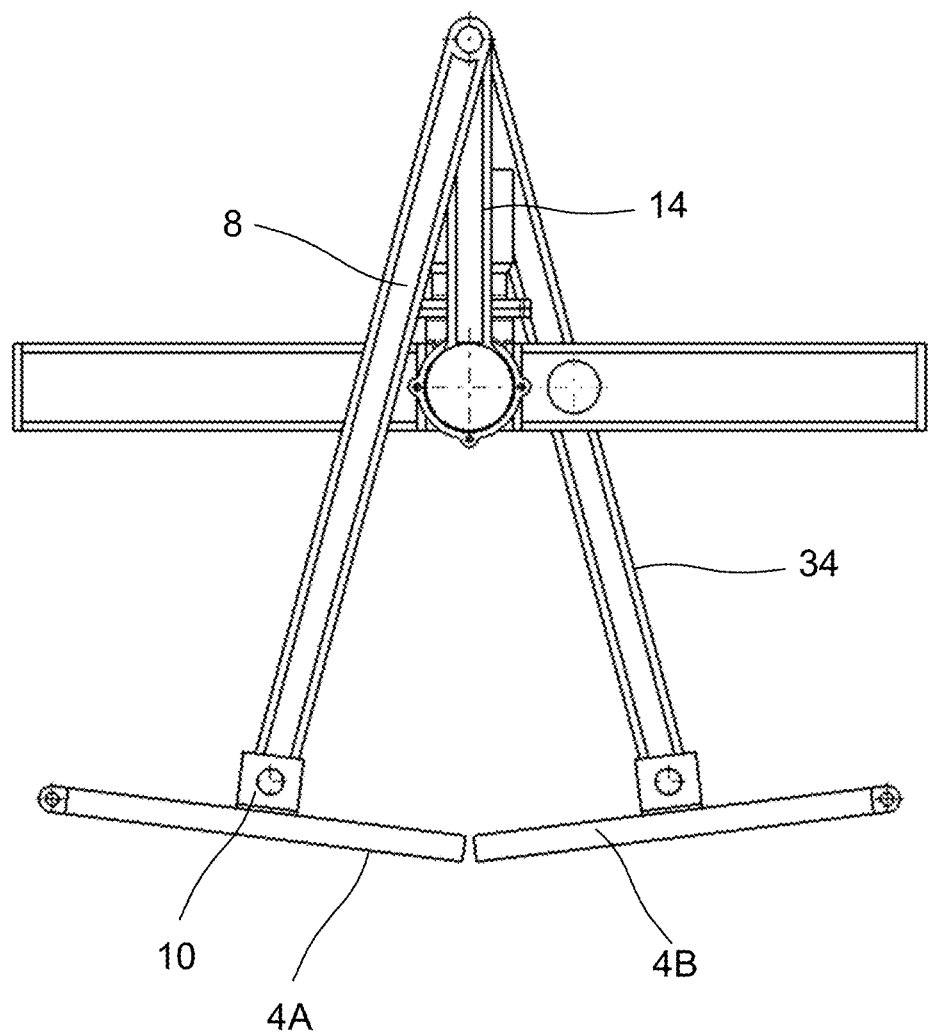
FIG. 6 is an end-on view of the door arrangement shown in FIG. 5.

FIG. 6 shows an end-on view of the door arrangement 2 in the configuration shown in FIG. 5. As shown, as the second member 14 rotates, the second member 14 moves the first member 8 which causes the door 4A to move towards an open position. The movement of the first member 8 is constrained by the pivotal connection between the first member 8, the door 4A and the second member 14, and thus the rotation of the second member 14 acts to drive the first pivot point 10 downwards. The same applies to the further door 4B, with the third member 34 and the fourth member 38 (not visible in this Figure).

Figure 7:
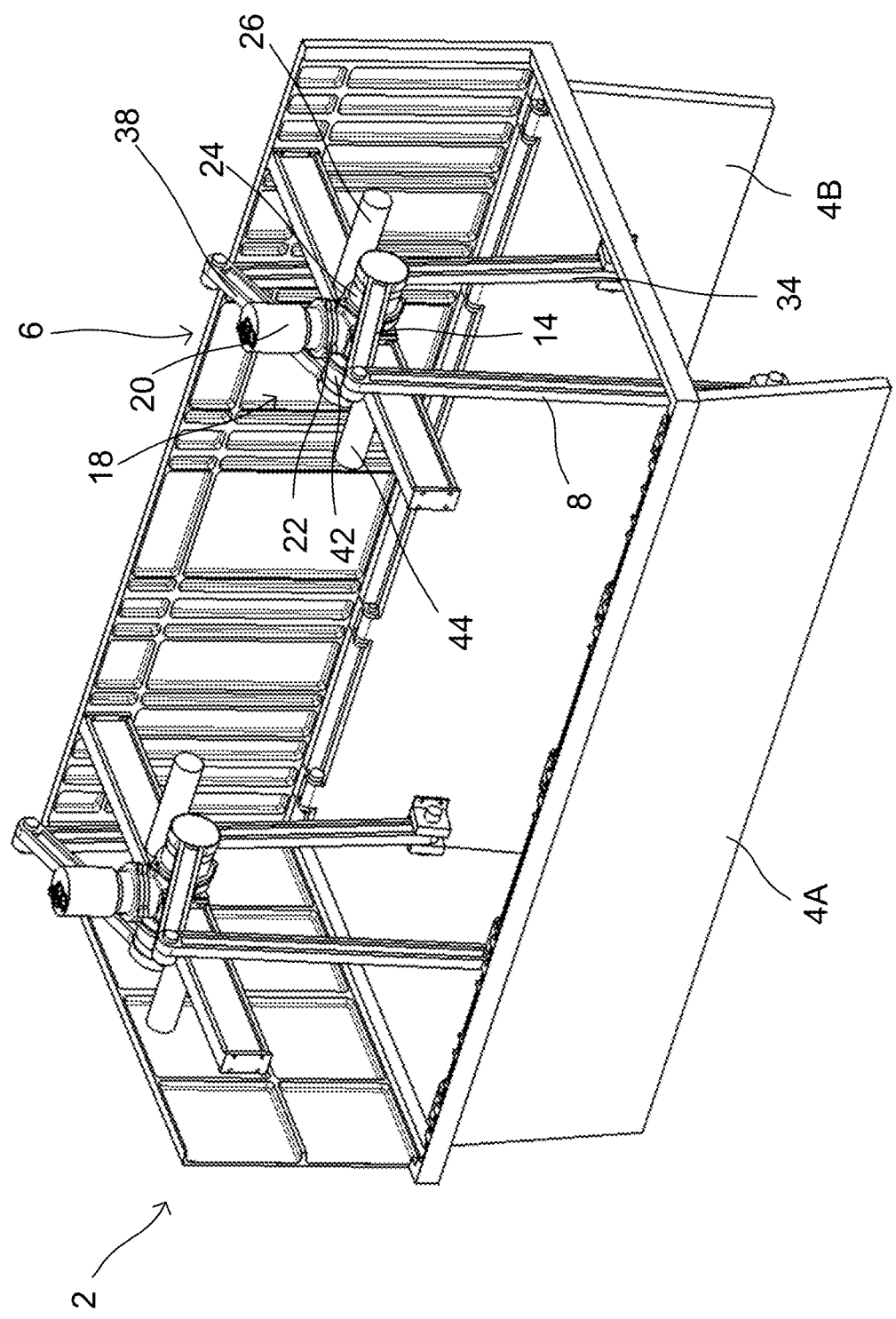
FIG. 7 is a perspective view of the door arrangement shown in FIG. 1 with the second and fourth members in a first position corresponding to the doors being in a fully open position.

FIG. 7 shows a perspective view of the door arrangement 2 with the second member 14 and fourth member 38 in a first position which corresponds to the door 4A and further door 4B being in an open position. The actuator 18, specifically the motor 20 and the dual output gearbox 22 may drive the second member 14 and fourth member 38 into the first position as shown, which thereby act to drive the first member 8 and third member 34 accordingly. As mentioned previously, the first output 24 and second output 42 may be synchronized such that the second member 14 and fourth member 38 move by the same amount. As the second member 14 and fourth member 38 move into the first position, the second member 14 and fourth member 38 move the first member 8, and third member 34, respectively, which each move the door 4A and further door 4B into the open position as depicted.

Figure 8:
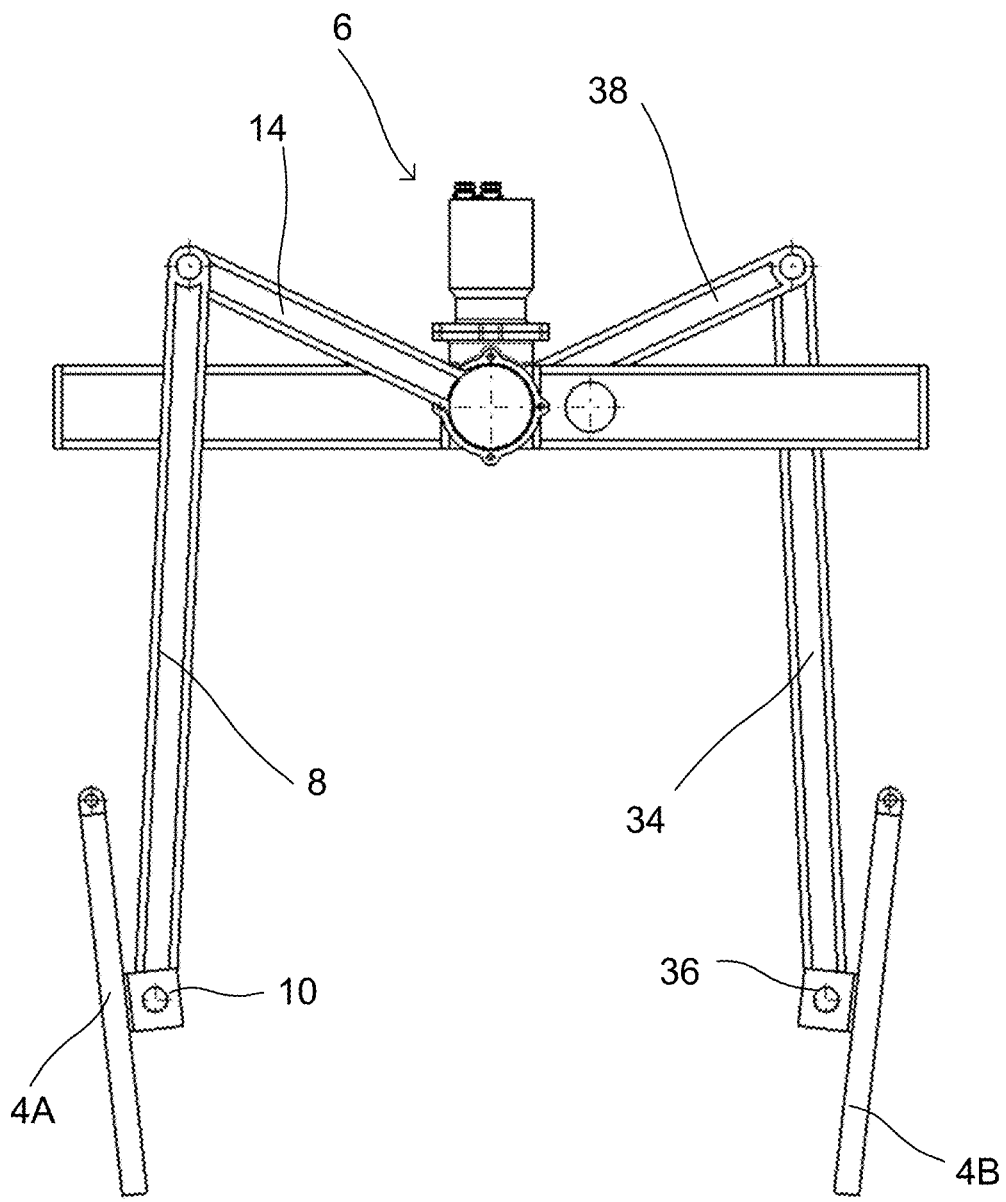
FIG. 8 is an end-on view of the door arrangement shown in FIG. 7.

FIG. 8 shows an end-on view of the door arrangement 2 shown in FIG. 7, focusing on the actuation arrangement 6, the door 4A and further door 4B. This Figure more clearly shows how when the second member 14 and fourth member 38 are moved into the first position, the first member 8 and third member 34 are driven downwards. Due to the pivotal coupling of the first member 8 to the door 4A at the pivot point 10 and the pivotal coupling of the third member to the door 4B at the pivot point 36, and due to each of the door 4A and the further door 4B being pivotally mounted, the downward movement of the first member 8 and third member 34 causes the door 4A and further door 4B to rotate out into an open position as depicted.

As will be appreciated by those skilled in the art, the door 4A and further door 4B may be moved from the open position shown in FIGS. 7 and 8, back into the closed position shown in FIGS. 1 and 2, by rotating the second member 14 and fourth member 38 in the opposite direction. This may be achieved by operating the motor 20 in the opposite direction. The second member 14 and fourth member 38 may rotate from the first position shown in FIGS. 7 and 8, through the second intermediate position shown in FIGS. 5 and 6, through the first intermediate position shown in FIGS. 3 and 4, until they are back in the second position shown in FIGS. 1 and 2. Additionally, whilst operation of the actuation arrangement 6 has been described above in relation to the opening of the door 4A and further door 4B, it will be appreciated that the further actuation arrangement 6A may operate simultaneously with the actuation arrangement 6 to drive the second end of the door 4A and further door 4B into the open position.

FIG. 9 shows a sectional view through the door arrangement 2 through the line A-A shown in FIG. 2A, when viewed from left to right in the direction indicated by arrows 33. This view more clearly shows the actuation arrangement 6, specifically the dual output gearbox 22 thereof. The motor 20 drives a single input 21 which results in rotation of the first output 24 and rotation of the second output 42. As depicted, the dual output gearbox 22 is in the form of a T-shaped gearbox. The second member 14 is coupled to the first output 24 such that rotation of the first output 24 drives rotation of the second member 14, which drives movement of the first member 8. The third member 34 and fourth member 38 cannot be seen in this Figure due to the position of the cross-section, but the fourth member 38 is driven to rotate by the second output 42 in a similar manner as the second member 14. The further actuation arrangement 6A operates in an identical manner to the actuation arrangement 6.

Figure 10A:
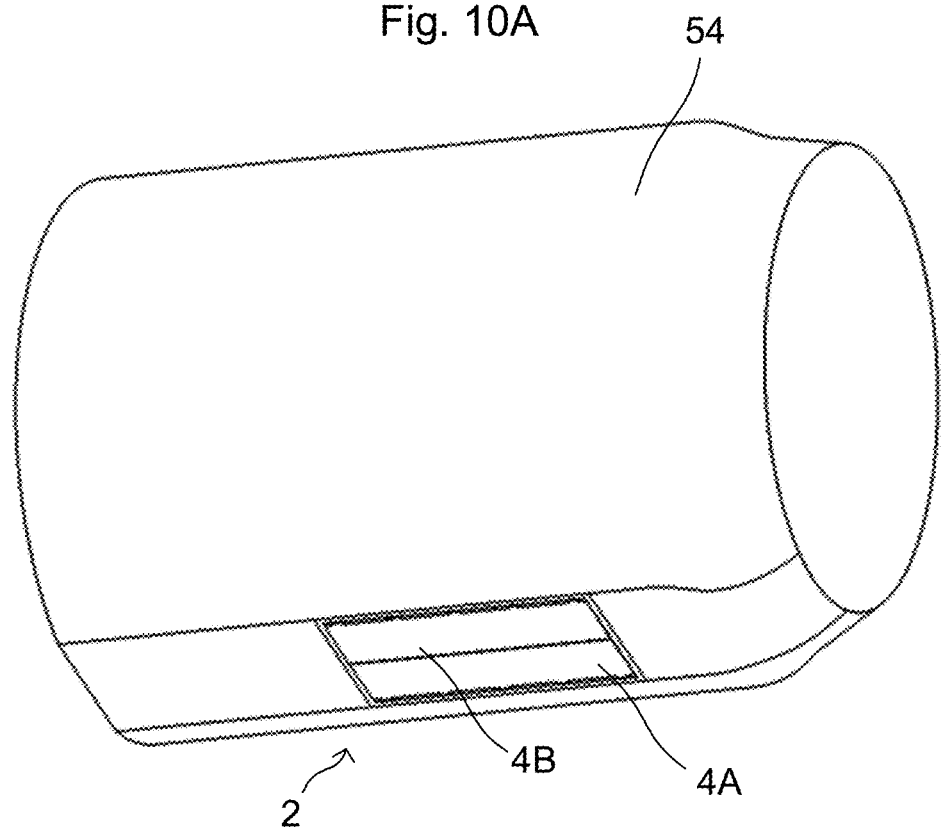
FIGS. 10A-10B show the door arrangement shown in FIG. 1 in an aircraft body in accordance with an example of the present disclosure.
Figure 10B:
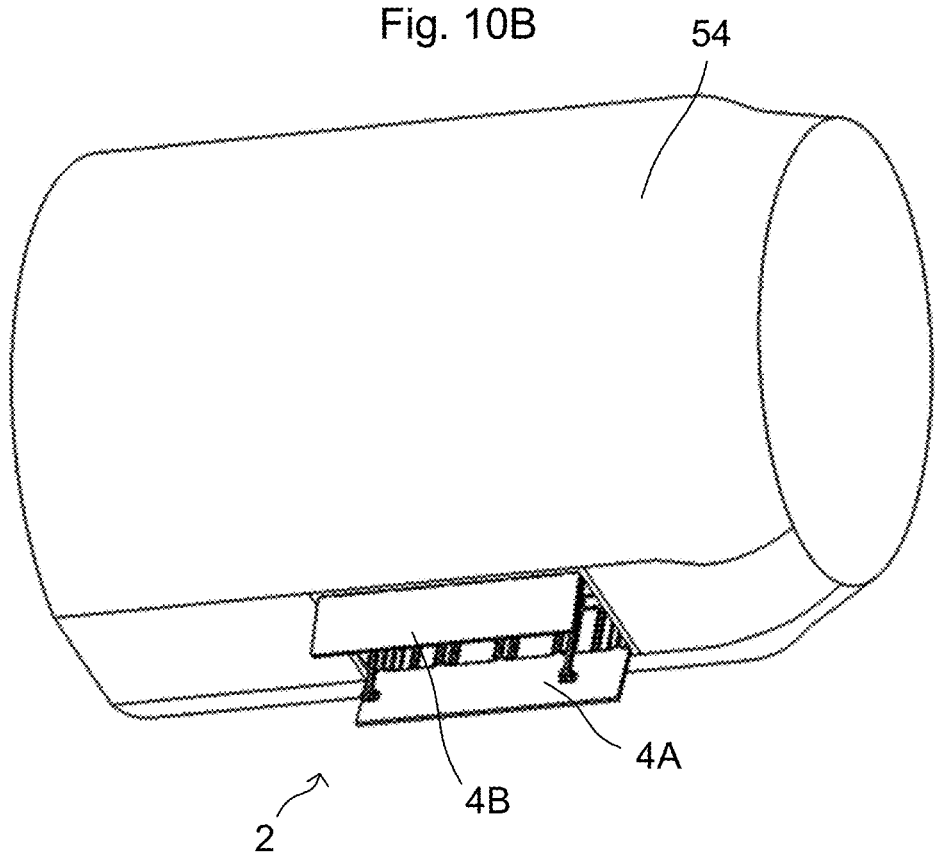

FIG. 10A illustrates an aircraft 54 comprising the door arrangement 2 shown in earlier Figures. For clarity, only a portion of the body of the aircraft 54 is shown. In FIG. 10A, the door arrangement 2 is in a closed configuration whereby the door 4A and further door 4B are in closed positions. This corresponds to the configuration of the door arrangement shown in FIGS. 1 and 2. FIG. 10B shows the aircraft 54 with the door arrangement 2 in an open configuration whereby the door 4A and further door 4B are in open positions. This corresponds to the configuration of the door arrangement 2 shown in FIGS. 7 and 8.

Figure 11A:
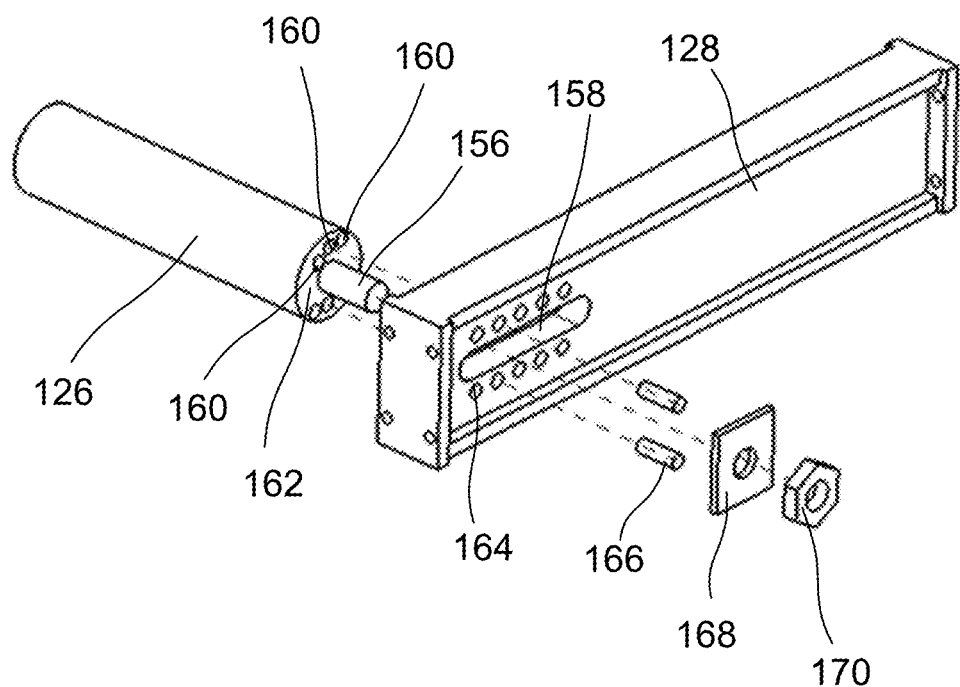
FIGS. 11A-11B illustrate a fixed stop which has an adjustable position in accordance with another example of the present disclosure.
Figure 11B:
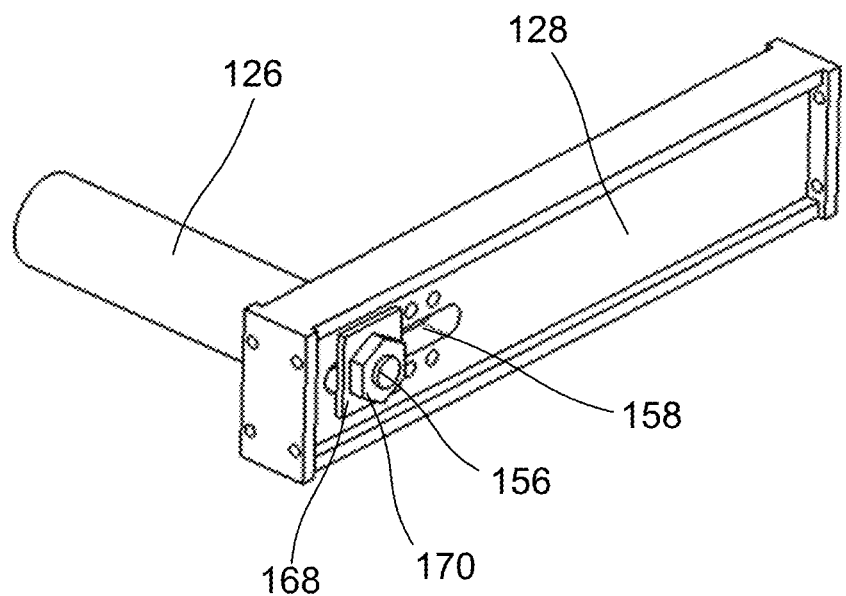

FIGS. 11A and 11B show an example of a fixed stop 126 in accordance with an example of the present disclosure whereby the position of the fixed stop 126 is adjustable. In the example depicted, similarly to the examples discussed above, the fixed stop 126 is attached to a beam 128. The fixed stop 126 comprises a rod 156 which extends from an end face 162 of the fixed stop 126. At least a portion of the rod 156 comprises an external thread. The rod 156 is dimensioned to extend through an elongate slot 158 in the beam 128. As will be appreciated, the position of the fixed stop 126 relative to the beam 128 may be adjusted by sliding the rod 156 along the elongate slot 158 until at a desired position, or inserting the rod 156 into the elongate slot 158 at the desired position.

The fixed stop further comprises a series of holes 160 which extend into the end face 162 of the fixed stop 126. The beam 128 comprises a series of through holes 164 which are arranged either side of the elongate slot 158. In the example depicted the through holes 164 are equally spaced, however it will be appreciated that the through holes 164 may have any appropriate spacing. The depicted arrangement further comprises two dowels 166 which are dimensioned to pass through the through holes 164 and extend into the holes 160 on the fixed stop 126. A dowel retention plate 168 is provided to hold the dowels 166 in position, and a threaded nut 170 is provided to engage the external thread on the rod 156, and thereby hold the fixed stop 126 in a fixed position relative to the beam 128.

Adjustment and fixing of the position of the fixed stop 126 will now be described with reference to FIG. 11A and FIG. 11B. The rod 156, on the fixed stop 126, is first passed into the elongate slot 158. The rod 156 may be inserted at the desired position, or alternatively the rod 156 may be inserted and may subsequently be moved within the elongate slot 158 into the desired position. Once in position, the dowels 166 may be inserted through the through holes 164 into the respective holes 160 in the fixed stop 126. The holes 160 on the fixed stop 126 may be arranged in a spiral configuration. As will be appreciated, such an arrangement of holes 160 may allow for fine adjustment of the fixed stop 126 relative to the beam 128. For example, the fixed stop 126 may be moved slightly within the elongate slot 158, and rotated accordingly, until an appropriate hole 160 aligns with a suitable through hole 164.

With the fixed stop 126 in the desired position, and the dowels 166 inserted through the through holes 164 and received by the respective holes 160, the fixed stop 126 will be held in a fixed position relative to the beam 128. In order to secure the fixed stop 126 in this position, the dowel retention plate 168 is placed onto the rod 156 and the threaded nut 170 is rotated onto the rod 156, engaging with the external thread thereon, until the plate 168 is firmly held against the beam 128. This fully assembled configuration is depicted in FIG. 11B.

As discussed previously, as the fixed stop 126 may at least partially define the position of the doors when in their closed position, adjustment of the position of the fixed stop 126 may permit adjustment of the closed positions of the doors. Adjustment of the fixed stop 126 as a means for adjusting the closed position of the doors may provide a convenient means for adjusting the closed position of the doors. The adjustable fixed stop 126 described above with respect to FIGS. 11A and 11B may be employed in any of the examples described above. The adjustable fixed stop 126 illustrated and described is just one example of how adjustment of the fixed stop 126 may be achieved and it will be appreciated that any other suitable arrangement which allows for the position of the fixed stop 126 to be adjusted may be employed.

In the example described above, the door arrangement 2 comprises two doors 4A, 4B. However, it will be appreciated that this is just for explanatory purposes and the door arrangement 2 may comprise only a single door, or indeed a larger number of doors. The actuation arrangement 6 may be adapted to suitably control an appropriate number of doors.

It will be appreciated by those skilled in the art that examples of the present disclosure provide an improved door arrangement which resists external forces that act to try and open the door. While specific examples of the disclosure have been described in detail, it will be appreciated by those skilled in the art that the examples described in detail are not limiting on the scope of the disclosure.

The invention claimed is:
1. A door arrangement, for use on an aircraft, comprising:
a door;
an actuation arrangement, configured to move the door between an open position and a closed position, comprising:
a first member coupled to the door such that movement of the first member moves the door;

a second member pivotally coupled to the first member and arranged to drive movement of the first member, wherein the second member is movable between a first position which corresponds to the door being in an open position and a second position which corresponds to the door being in a closed position; and an actuator arranged to rotate the second member between the first position and second positions; and a fixed stop arranged such that when the second member is in the second position, an external force acting on the door acting to move the door towards its open position causes at least one of the first member and the second member to contact the fixed stop and thereby prevent movement of the door towards the open position.

2. The door arrangement of claim 1, wherein the first member and second member form an over centre arrangement, and wherein when the second member is in the second position, the first member and second member are in an over centre position such that the external force acts to drive the first member towards the fixed stop.

3. The door arrangement of claim 1, wherein the fixed stop is positioned such that only the first member comes into contact with the fixed stop.

4. The door arrangement of claim 1, wherein the door is pivotally mounted to a support structure at a first pivot point.

5. The door arrangement of claim 1, wherein the first member is pivotally coupled to the door at a second pivot point.

6. The door arrangement of claim 1, wherein the fixed stop is detachably mounted and wherein a position of fixed stop is adjustable.

7. The door arrangement of claim 1, wherein the first member and/or the second member is made from a material with a higher wear resistance than the fixed stop.

8. The door arrangement of claim 1, wherein the fixed stop comprises a rounded surface against which the first member and second member comes into contact with.

9. The door arrangement of claim 1, wherein the first member and/or the second member comprises a respective rounded surface arranged to come into contact with the fixed stop.

10. The door arrangement of claim 1, wherein the actuator is arranged to actively drive the first and/or second member into contact with the fixed stop when the door is in the closed position.

11. The door arrangement of claim 1, comprising a further door, and wherein the actuation arrangement comprises:

a third member coupled to the further door such that movement of the third member moves the further door between an open position and a closed position;

a fourth member pivotally coupled to the third member and arranged to drive movement of the third member, wherein the fourth member is movable between a respective first position which corresponds to the further door being in the open position and a respective second position which corresponds to the further door being in the closed position; and a further fixed stop arranged such that when the fourth member is in the second position, an external force acting on the further door acting to move the further door towards its open position causes at least one of the third member and fourth member to contact the fixed stop and thereby prevent movement of the further door towards the open position.

12. The door arrangement of claim 11, wherein the actuator is further arranged to drive the fourth member between the first position and second position.

13. The door arrangement of claim 12, wherein the actuator comprises a dual output gearbox which comprises a first output and a second output, and wherein the first output is arranged to rotate the second member and the second output is arranged to rotate the fourth member.

14. An aircraft comprising:
a door arrangement according to claim 1.

15. An actuation arrangement, for moving a door on an aircraft between an open position and a closed position, the actuation arrangement comprising:

a first member configured to be coupled to the door such that movement of the first member moves the door;

a second member pivotally coupled to the first member and arranged to drive movement of the first member, wherein the second member is movable between a first position which corresponds to the door being in an open position and a second position which corresponds to the door being in a closed position; and an actuator arranged to rotate the second member between the first position and second position; and a fixed stop arranged such that when the second member is in the second position, an external force acting on the first member causes at least one of the first member and the second member to contact the fixed stop and thereby prevent movement of the first member.

* * * * *